United States Patent
Doerr et al.

(10) Patent No.: US 7,149,407 B1
(45) Date of Patent: Dec. 12, 2006

(54) ORTHOGONAL HETERODYNE OPTICAL SIGNAL-TO-NOISE-RATIO (OSNR) MONITORING METHOD AND APPARATUS

(75) Inventors: Christopher Doerr, Middletown, NJ (US); Daniel Kilper, Rumson, NJ (US); Lothar Moeller, Middletown, NJ (US); Roland Ryf, Marlboro, NJ (US); Chongjiin Xie, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 12 days.

(21) Appl. No.: 11/365,742

(22) Filed: Feb. 28, 2006

(51) Int. Cl.
*G02B 6/00* (2006.01)

(52) U.S. Cl. .......................... 385/147; 385/11; 385/24; 455/278.1

(58) Field of Classification Search ................. 385/10, 385/11, 14–16, 24, 31, 33–37, 147; 359/337.13; 356/459; 250/339.02; 342/194, 195; 372/72
See application file for complete search history.

(56) References Cited

U.S. PATENT DOCUMENTS 6,587,606 B1 * 7/2003 Evans .......................... 385/15
2003/0228857 A1 * 12/2003 Maeki ..................... 455/278.1

* cited by examiner

*Primary Examiner*—Phan Palmer (57) ABSTRACT

An orthogonal heterodyne in-band optical signal-to-noise-ratio (OSNR) monitoring method and apparatus that use the polarization characteristics of two narrow bandwidth filtered optical spectral components which is not only insensitive to the effects of polarization mode dispersion (PMD) and inter-channel cross-phase modulation (XPM) induced nonlinear polarization scattering, but also independent of bit rate and modulation format. The monitoring method is demonstrated for both linear and nonlinear systems.

20 Claims, 9 Drawing Sheets

ORTHOGONAL HETERODYNE OPTICAL SIGNAL-TO-NOISE-RATIO (OSNR) MONITORING METHOD AND APPARATUS

FIELD OF THE INVENTION

This invention relates generally to the field of optical communications and in particular to an optical signal-to-noise-ratio monitoring method and apparatus that is not only insensitive to polarization mode dispersion and nonlinear polarization scattering, but independent of modulation formats and bit rates as well.

BACKGROUND OF THE INVENTION

A major source of impairment in all-optical networks is the amplified spontaneous emission (ASE) noise arising from optical amplifiers, usually quantified by the optical signal-to-noise-ratio (OSNR). In static point-to-point Wavelength Division Multiplexing (WDM) networks, the OSNR may be estimated by linearly interpolating out-of-band ASE noise levels (See, e.g., H. Suzuki, N. Takachio, "Optical Signal Quality Monitor Built into WDM Linear Repeaters Using Semiconductor Arrayed Waveguide Grating Filter Monolithically Integrated with Eight Photodiodes," Electron. Lett., vol. 35, no. 10, pp. 836–837, 1999).

Unfortunately, the OSNR cannot be measured accurately using such spectral methods in transparent reconfigurable dense WDM networks where each channel may traverse different routes, add-drop filters, and optical amplifiers. (See, e.g., D. C. Kilper, S. Chandrasekhar, L. Buhl, A. Agarwal, D. Maywar, "Spectral Monitoring of OSNR in High-Speed Networks," Proc. ECOC'2002, paper 7.4.4, 2002). To further compound the problem, there is little spectrum available for monitoring between channels.

In-band OSNR monitoring methods that measure noise power within individual channels have to be used for all-optical dense WDM networks. Several methods for in-band OSNR monitoring have been proposed. One approach is to use optical polarization information, such as the degree of polarization (DOP) method and polarization nulling method (See, e.g., M. Petersson, H. Sunnerud, B-E Olsson, M. Karlsson, "Multi-Channel OSNR Monitoring for WDM Networks," Proc. ECOC'2002, paper 1.1.6, 2002; J. H. Lee, D. K. Jung, C. H. Kim, and Y. C. Chung, "OSNR Monitoring Technique Using Polarization-Nulling Method," IEEE Photon. Technol. Lett., vol. 13, pp. 88–90, January 2001). Another approach measures the beating term between signal and amplified spontaneous emission (ASE) noise (See, e.g., S. K. Shin, K. J. Park, and Y. C. Chung, "A Novel Optical Signal-to-Noise Ratio Monitoring Technique for WDIM Networks", Proc. OFC'2000, paper WK6, 2000; C. Dorrer and X. Liu, "Noise Monitoring of Optical Signals Using RF Spectrum Analysis and Its Application to Phase-Shift-Keyed Signals", IEEE Photon. Technol. Lett., vol. 16, pp. 1781–1783, 2004; and W. Chen, R. S. Tucker, X. Yi, W. Shieh, and J. S. Evans, "Optical Signal-to-Noise Ratio Monitoring Using Uncorrelated Beat Noise", IEEE Photon. Technol. Lett., vol. 17, pp. 1781–1783, 2005).

Polarization-assisted OSNR monitoring techniques such as these capture and analyze the in-band ASE noise, and they are relatively simple to implement. Unfortunately however, polarization mode dispersion (PMD) and inter-channel cross-phase modulation (XPM) induced nonlinear polarization scattering in WDM systems introduce large errors in these techniques (See, e.g., C. Xie, L. Möller, D. C. Kilper, and L. F. Mollenauer, "Impact of Cross-Phase Modulation Induced Polarization Scattering on Optical PMD Compensation in WDM Systems", Opt. Lett., vol. 28, no. 23, pp. 2303–2305, 2003; C. Xie and D. C. Kilper, "Influences of Polarization Scattering on Polarization-Assisted OSNR Monitoring in Dense WDM Systems with NZ-DSF and Raman Amplification," Proc. OFC'2005, paper JWA40, 2005).

Supplemental techniques which use narrow bandwidth optical filters and additional measurements have been employed to reduce errors caused by PMD and the nonlinear polarization scattering effects with limited success. (See, e.g., J. H. Lee, and Y. C. Chung, "An Improved OSNR Monitoring Technique Based on Polarization-Nulling Method," Proc. OFC'2001, paper TuP6, 2001; M-H. Cheung, L-K. Chen, and C-K. Chan, "A PMD-insensitive OSNR monitoring scheme base on polarization-nulling with off-center narrowband filtering," Proc. OFC'2004, paper FF2; and M. Skold, B-E. Olsson, H. Sunnerud, and M. Karlsson, "PMD insensitive DOP-based OSNR Monitoring by spectral SOP Measureents," Proc. OFC'2005, paper OThH3, 2005.)

The prior art OSNR monitoring techniques based upon signal-ASE beating term measurement—while typically polarization independent—impose special signal requirements, such as a particular bit length, special modulation format, or a symmetrical spectrum. Therefore such techniques are simply not suitable for application in real networks.

SUMMARY OF THE INVENTION

We have developed, in accordance with the principles of the invention, a simple in-band OSNR monitoring method called the "Orthogonal Heterodyne Method", which employs two narrow bandwidth optical filters and utilizes signal polarization characteristics of the two filtered optical spectral components. Advantageously—and in sharp contrast to the prior art—our inventive OSNR monitoring technique and apparatus is not only insensitive to PMD and robust to the nonlinear polarization scattering that plagued the prior art, but is also independent of modulation format and bit rate.

BRIEF DESCRIPTION OF THE DRAWING

A more complete understanding of the present invention may be realized by reference to the accompanying drawing in which.

DETAILED DESCRIPTION

Figure 1:
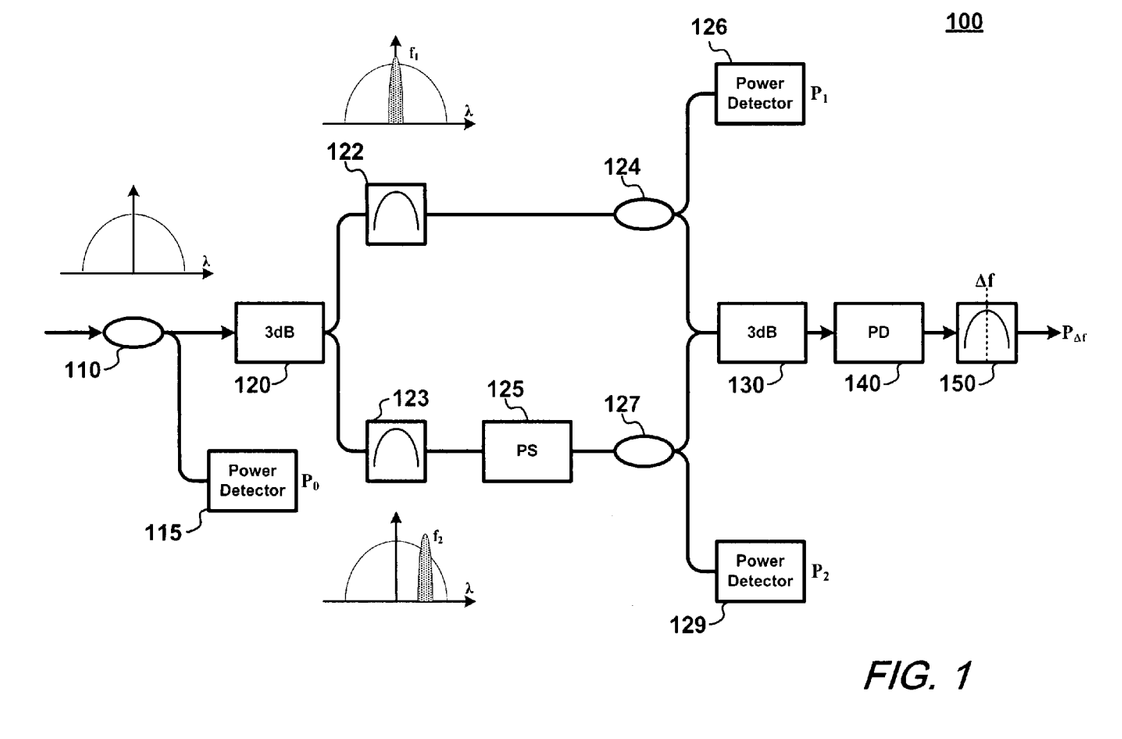
FIG. 1 is a schematic of an optical apparatus for monitoring optical signal-to-noise-ratios according to the present invention.

FIG. 1 shows a schematic of an optical apparatus 100 which we will use to demonstrate and explain our inventive optical signal-to-noise-ratio measurement method. With reference to that FIG. 1, it is shown that an input optical signal is first "tapped" by optical coupler 110 such that a power measurement of the input signal $P_0$ is made by power detector 115. The input signal is subsequently split through the effect of 3 dB coupler 120 and the split signal(s) sent into separate "branches" (Branch 1—Upper; Branch 2—Lower) of our apparatus.

In each of the branches, there is positioned a narrow bandwidth optical filter 122, and 123. As shown in FIG. 1, the center frequency of the two filters is represented as $f_1$ and $f_2$ and their bandwidth(s) $B_1$ and $B_2$, respectively. In addition, the two optical filters are non-overlapping, that is, $\Delta f = |f_1 - f_2| > (B_2 + B_1)/2$.

In upper Branch 1, an optical signal exiting the narrow bandwidth optical filter 122 is tapped through the effect of coupler 124 and power detector 126 measures the optical power $P_1$ of the tapped signal. Similarly, in lower Branch 2, an optical signal exiting the narrow bandwidth optical filter 123 is first polarization scrambled through the effect of polarization scrambler 125 and then subsequently tapped by coupler 127 for optical power measurement $P_2$ by power detector 129.

Optical signals which have traversed the upper Branch 1 and lower Branch 2 are combined by coupler 130. The combined optical signal is directed to a photodetector 140, the electrical output of which is received by electrical bandpass filter (EBF) 150, centered at frequency $\Delta f$, thereby selecting beating terms between the optical signals received from branch 1 and branch 2. The output of the EBF 150, is the RF power at $\Delta f$ which may be measured by a conventional RF power detector, producing power measurement $P_{\Delta f}$.

With this apparatus 100 in mind, we are now in position to explore the theoretical foundation of our inventive method. For convenience of analysis, we assume that any noise is completely depolarized and the optical signal(s) at Branches 1 and 2 are fully polarized due to the narrow bandwidth optical filters 122, 123. (We will show later that Polarization Mode Dispersion (PMD) induced depolarization of the signal has little effect on the result).

We note that the Polarization Scrambler 125 can always find any position(s) that orthogonally polarize the signals output from Branches 1 and 2 and received at combiner 130. In this case, there is no signal—signal beating at the detector 140, and the RF signal output from the detector only contains signal-ASE noise beating and ASE—ASE noise beating terms and has the smallest power.

The orthogonally polarized position can be found by measuring the RF power $P_{\Delta f}$. From the measured minimum RF power $P_{\Delta f}$ after the EBF 150 and the optical power measured in Branches 1 and 2 ($P_1$, and $P_2$ respectively) we can obtain the noise power orthogonally polarized to the signal from the following relationship:

$$N_\perp = \frac{(\alpha P_1 + P_2) - \sqrt{(\alpha P_1 + P_2)^2 - 16\alpha P_{\Delta f} B_2 / (R^2 R_L B_e)}}{4\alpha} \quad (1)$$

where $B_e$ is the electrical filter bandwidth, R is the responsivity of the Photo Detector 140, $R_L$ is the load resistor, and $\alpha$ is the ratio of the noise power after the filters 122, and 123. The details of the derivation of Eq. (1) is shown in the Appendix.

Here we assume that $B_2 \geq B_1$. Assuming the noise power is completely depolarized, the OSNR can be expressed as:

$$OSNR = \frac{P_0}{2N_\perp} \frac{B_2}{B_{OSNR}} - \frac{B_{ch}}{B_{OSNR}} \quad (2)$$

where $B_{ch}$ is the channel filter bandwidth, $P_0$ is the optical power measured initially after the channel filter (not specifically shown in FIG. 1), and $B_{OSNR}$ is the OSNR reference bandwidth, which is usually defined as 0.1 nm.

Advantageously, and in sharp contrast to the prior art degree of polarization-based OSNR measuring techniques, our inventive method does not require very narrow bandwidth optical filters to reduce the PMD effects. In fact, and due to the special relation of polarization states between the signal after filters 122 and 123, first-order PMD effects can be completely eliminated even when the bandwidth of the two filters is not very narrow.

This aspect of our invention may be explained with reference to FIG. 2, which shows the polarization state relation between the signal(s) in Branches 1 and 2 when affected by PMD. In particular, if there exists only first-order PMD, the polarization states at difference frequencies distribute along a circle in Poincaré sphere according to $\partial \vec{s}/\partial \omega = \vec{\Omega} \times \vec{s}$, where $\vec{\Omega}$ is the PMD vector and $\vec{s}$ is the state of polarization (SOP) of the signal.

Figure 2:
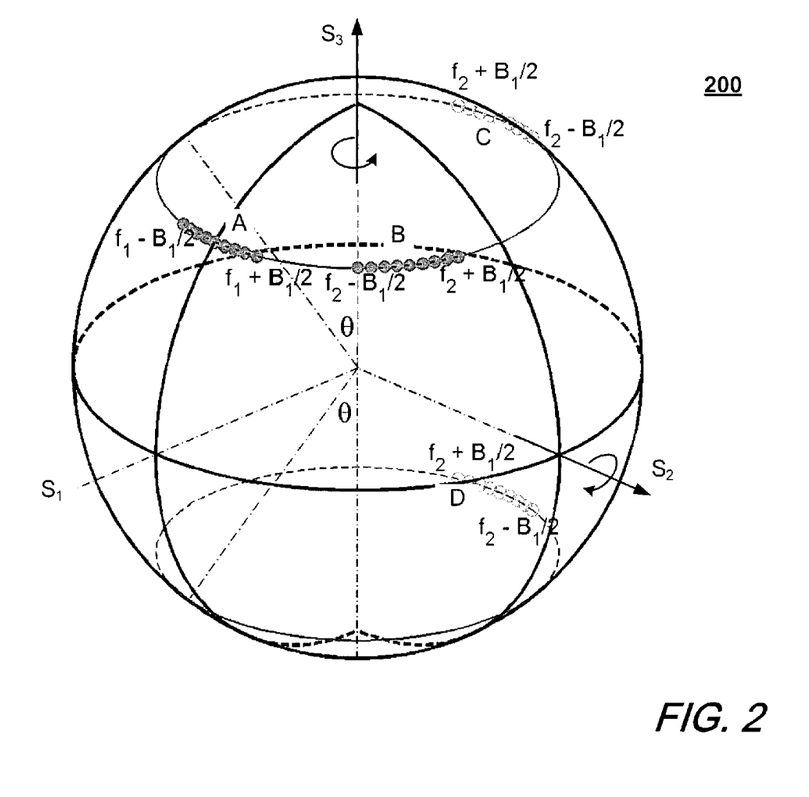
FIG. 2 is a graph showing the relation of the polarization state between signals in Branches 1 and 2 of the apparatus of FIG. 1.

Without loss of generality, we assume that the PMD vector is in $S_3$ direction, as shown in FIG. 2. The polarization states of the signal after OBF1 122 and after OBF2 123 but before the Polarization Scrambler 125 are in positions A in and B, respectively. We can use the Polarization Scrambler 125 to rotate the polarization states of the signal after OBF2 123 first to position C, which is in the same circle as but opposite to position A, then make a rotation around axis $S_2$ for 180−θ degrees to position D, where θ is the angle between the PMD vector and SOP of the signal. After the Polarization Scrambler 125, each pair of signal components between Branches 1 and 2 with $\Delta f$ frequency difference is orthogonally polarized (anti-parallel in Stokes space).

As we show in our later analysis, the RF power at frequency $\Delta f$ is the contribution of beating between the components in the two branches with $\Delta f$ frequency difference. Therefore, although the signal after the two narrow bandwidth optical filters 122, 123 could be depolarized due to large PMD and/or not narrow enough filters bandwidth, the signal—signal beating term can be completely eliminated. Therefore, our inventive method is virtually insensitive to PMD effects. Due to a similar mechanism, our inventive method is also robust to the nonlinear polarization scattering, (although the effect of nonlinear polarization scattering is not as clear as that of PMD), as we have shown with our experiments.

While very narrow bandwidth filters are not necessary to reduce these polarization effects, narrow bandwidth filters are still preferred. They can reduce the speed requirement on the Photo Detector 140 and subsequent electronics as $\Delta f > (B_1+B_2)/2$ is needed to make the beating term frequencies of the signal within each branch less than $\Delta f$. Of additional utility, narrow bandwidth filters can also suppress high-order PMD effects.

Figure 3:
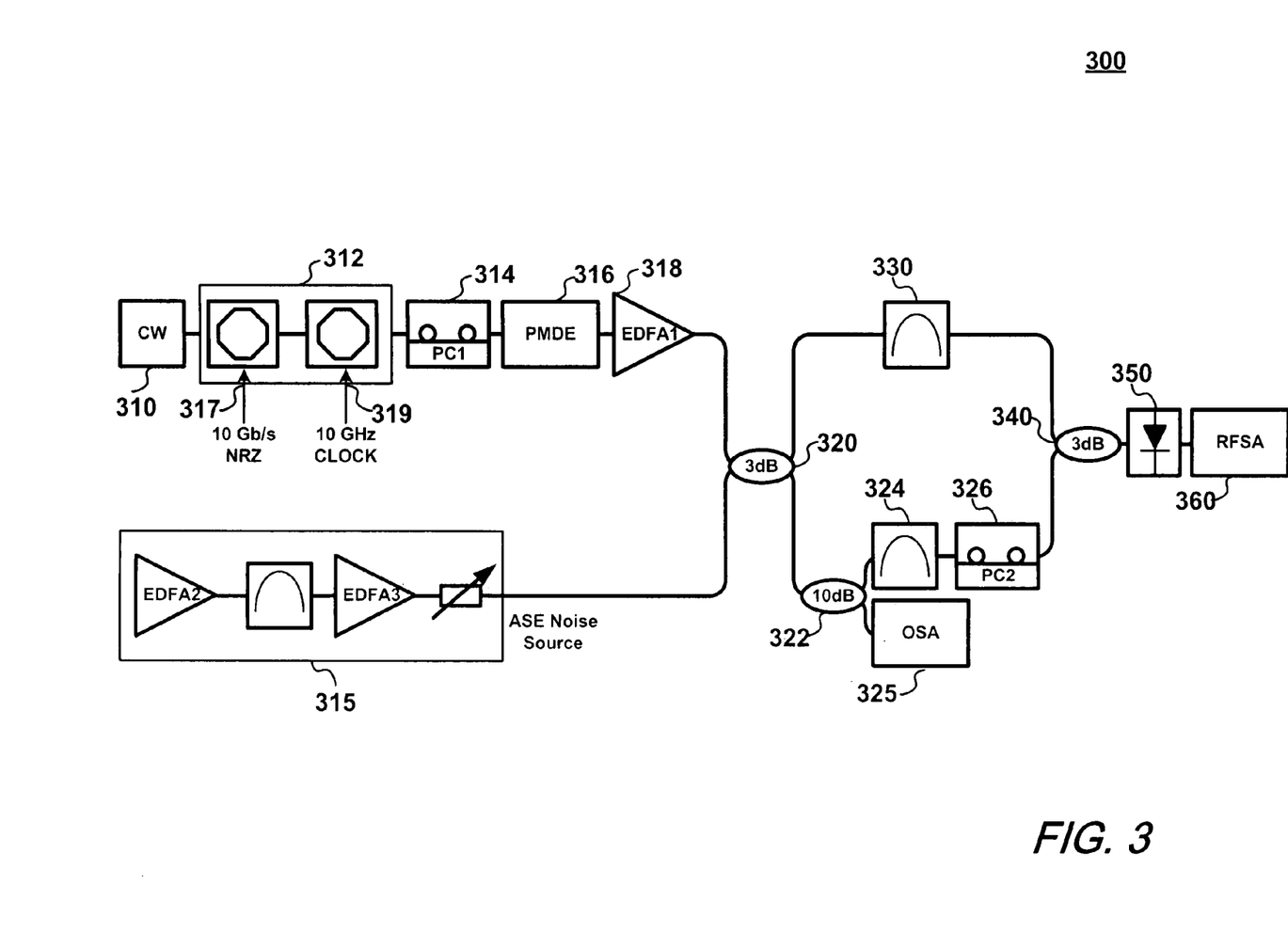
FIG. 3 is a schematic of an experimental apparatus used to evaluate the method of the present invention.

We demonstrated and evaluated our inventive method first, in a linear system, which did not have any nonlinear polarization scattering. The experimental setup for the linear system is shown in FIG. 3.

As shown, a CW source 310 having a wavelength of 1547.7 nm was modulated with two Lithium Niobate Mach-Zehnder interferometer (MZI) modulators 312 by a 10-Gb/s electrical NRZ signal 317 and a 10 GHz clock 319 to generate a 50% duty cycle return-to-zero (RZ) optical signal. After passing through a polarization controller PC1 314 and a first-order PMD emulator (PMDE) 316, the signal was amplified by an optical amplifier EDFA1 318 and then combined with amplified spontaneous emission (ASE) noise by a 3 dB coupler 320. The ASE noise was generated by an ASE Noise Source 315 comprising two EDFAs cascaded together with a 5 nm bandwidth optical filter interposed between them, and an attenuator, used to adjust the OSNR level.

The combined signal and noise was split into two branches. In the upper branch was positioned a narrow bandwidth optical filter OBF1 330. In the lower branch, the signal was first tapped by a 10 dB coupler 322 to permit monitoring of OSNR with an optical spectrum analyzer (OSA) 325, and then was directed through a narrow bandwidth optical filter OBF2 324, a polarization controller PC2 326, and subsequently combined with the signals from the upper branch through the effect of a 3 dB coupler 340. As can be readily appreciated by those skilled in the art, the polarization state of the signal in the lower branch was adjusted by PC2 326.

The combined signal was detected by a Photo Detector 350 and then analyzed by an RF spectrum analyzer (RFSA) 360. When the signals in the two branches were orthogonally polarized, we measured a minimum RF power in the RFSA 360.

The two narrow bandwidth optical filters 330, 324 used are free space grating based tunable filters that are both center frequency and filter bandwidth adjustable. As the two filters exhibited about a 10 dB insertion loss, we used a high power EDFA with about 27 dBm output power as EDFA1 318.

It is important to note that a variety of free space grating based filter configurations are useful with our inventive method and structures. In particular, we have shown in FIG. 3 two, independent grating based filters 330, 324 which were operating in a double pass configuration, a lower loss single pass grating based filter could also be used, effectively eliminating one or more component(s) and their loss(es).

Figure 3A:
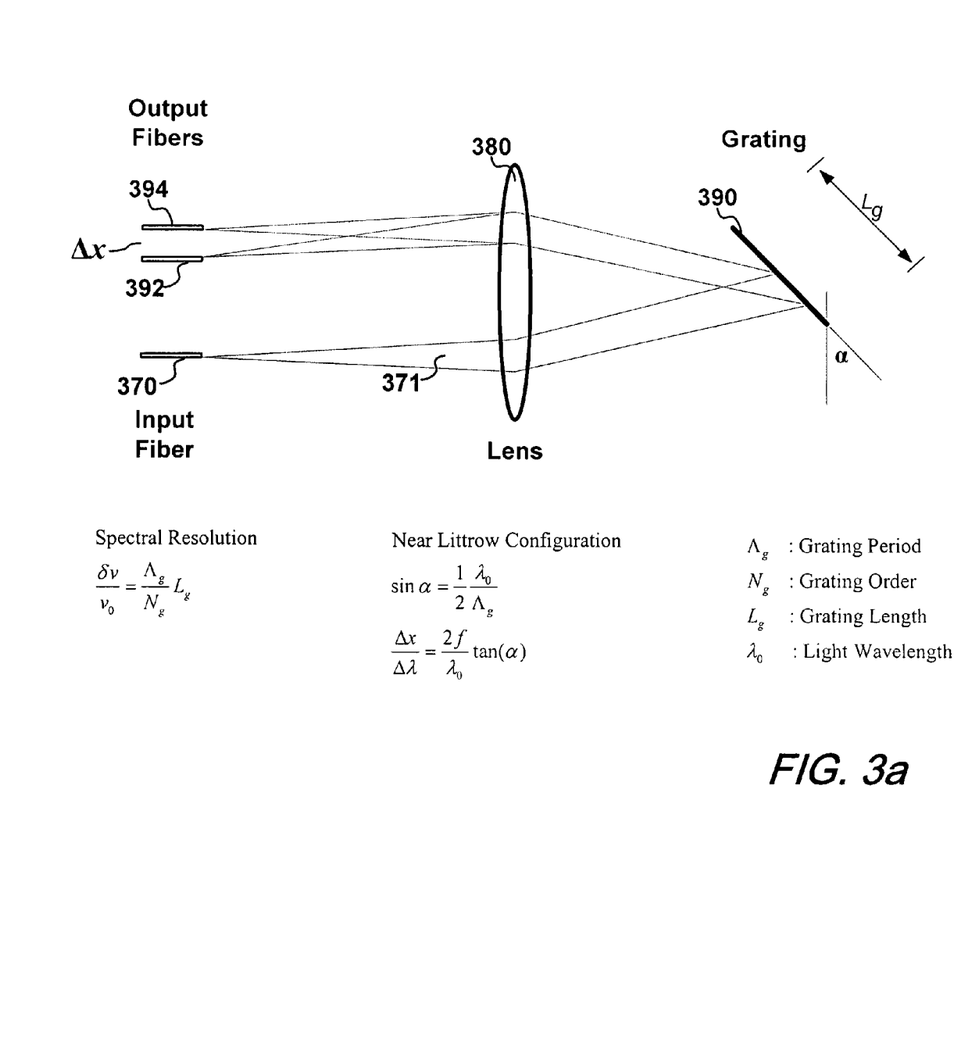

Such a single pass grating based double filter is shown schematically in FIG. 3a. Specifically, a light signal is coupled into the grating based filter device through optical fiber 370. The input light diffracts 371 and is then collimated through the effect of lens 380. The collimated light is diffracted through the effect of grating 390, and (in this particular example) reflected back through lens 380 and, depending upon its wavelength, focused into output fibers 392, 394. Such a grating is preferably a high dispersion diffraction grating exhibiting a low polarization dependent diffraction loss. (i.e., high order Eschelle gratings).

As noted, if the light reflected from the grating has a correct wavelength it will be coupled into one of the two output fibers 392, 394. The spacing of the output fibers will determine the distance between the two filter frequencies $f_1$, and $f_2$. Because the distance between the output fibers 392, 394 is small, a dual jewel fiber ferrule or edge coupling from a planar lightwave circuit (PLC) will preferably employed.

The distance between the output fibers is related to the frequency difference $f_1-f_2$, according the following relationship:

$$Dx=4(f_1-f_2)/(f_1-f_2)FL\tan(\alpha)$$

where FL is the focal length of the lens which can be arbitrarily chosen and $\alpha$ is the Littrow angle for the grating and therefore a property of the grating chosen. Note that while we have discussed this alternative free space grating based filter arrangement using a reflective grating, a transmissive grating would work as well, depending upon the physical geometries required. In addition, instead of coupling the light into the output fibers, one could optionally employ other components such as polarization scrambler(s) and/or combiners using free space optical components. Lastly, such a device may advantageously be tuned to select a particular wavelength channel by either moving the fiber in the input plane or preferably by tilting the grating along the ruling direction.

Figure 4:
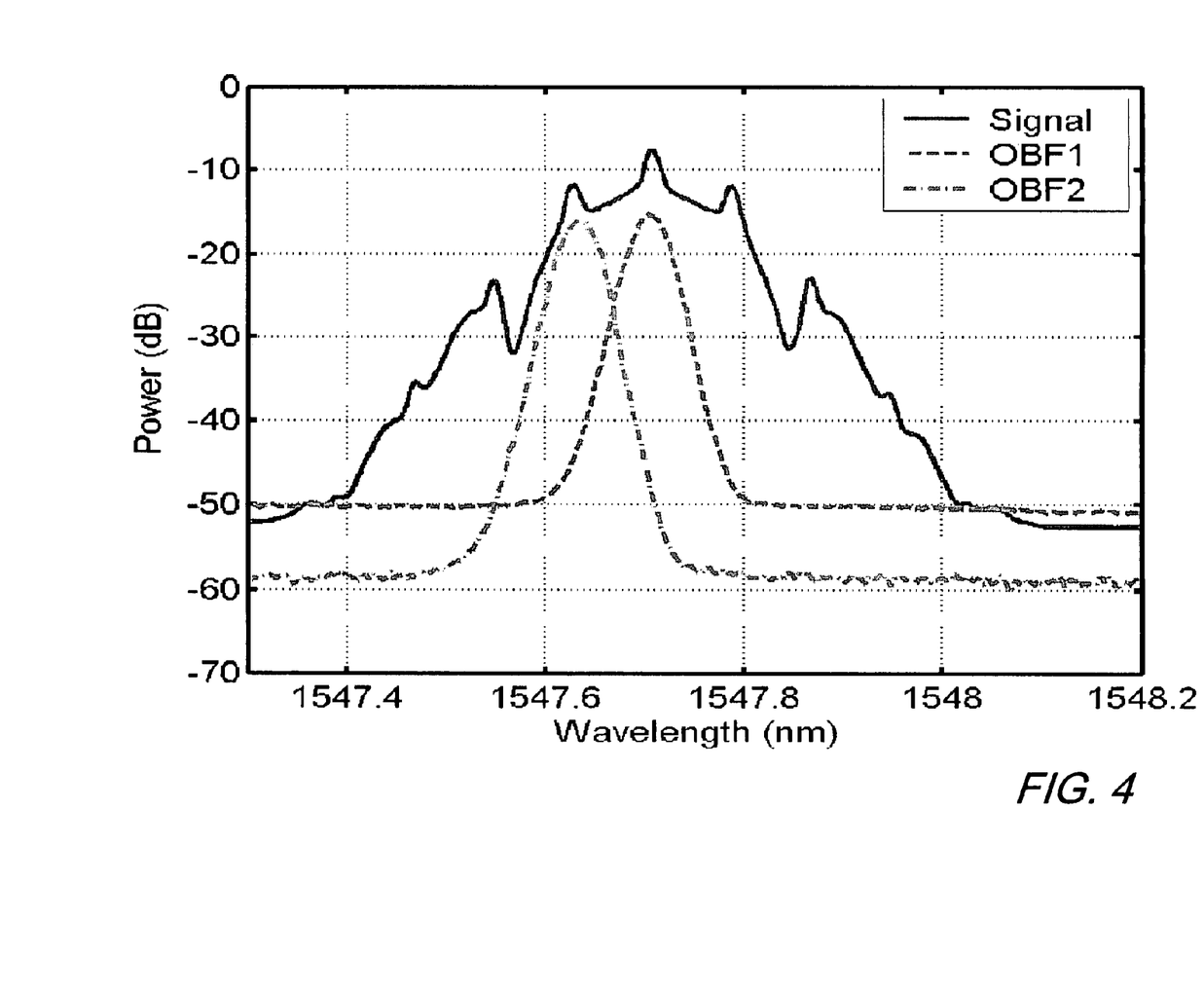
FIG. 4 is a graph showing the spectrum of signal and narrow bandwidth optical filters of the experimental apparatus of FIG. 3.

The spectrum of signal and the filters are shown graphically in FIG. 4. As can be observed from that FIG. 4, the signal spectrum shows the signal is a 10-Gb/s RZ signal. The 10 dB bandwidth of the filters is about 9 GHz and the center frequency difference between the two filters is about 10 GHz.

Figure 5A:
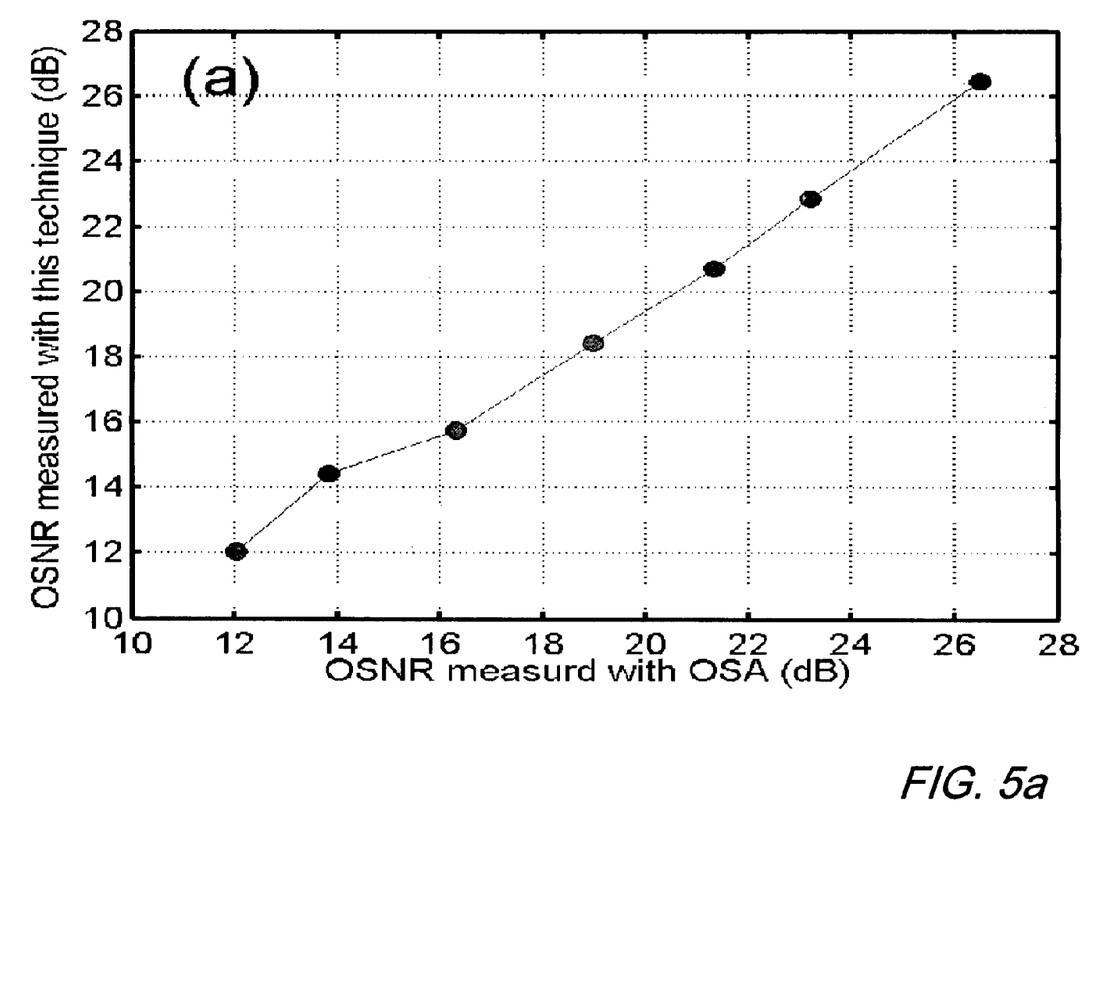
FIG. 5a, and 5b are graphs showing the measured OSNR for experimental systems both a) with and b) without PMD, respectively.
Figure 5B:
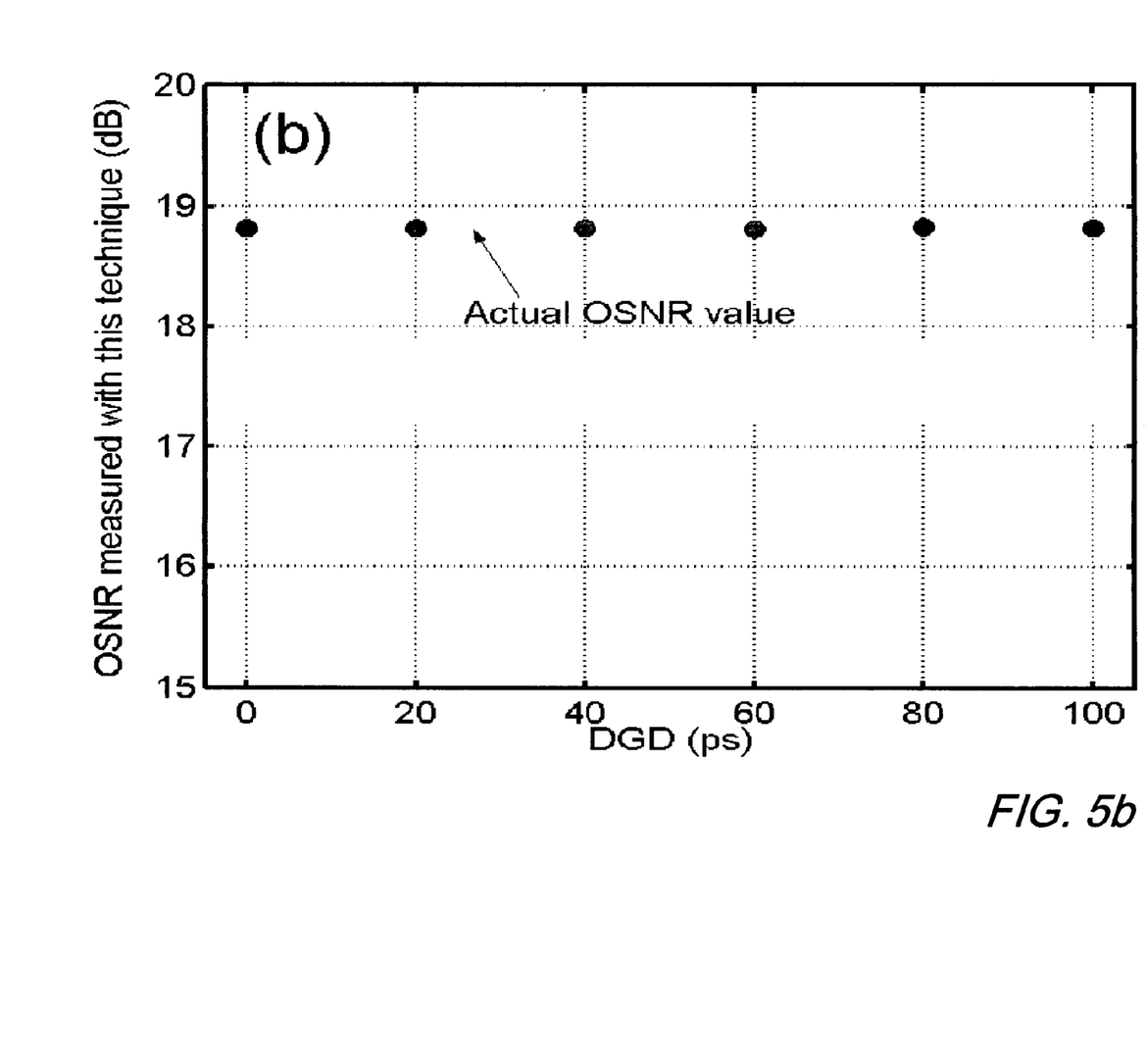

FIGS. 5a and 5b show the measured OSNR with and without the PMD effects, respectively. In our experiment, we measured the minimum RF power at 10.5 GHz to avoid the 10 GHz tone. For the purpose of demonstration, only the minimum RF power was measured, and the OSNR was obtained with calibration.

FIG. 5a shows the OSNR measured with this technique versus the OSNR measured with the OSA when there was no PMD in the system. The OSNR is in 0.1 nm. It shows the OSNR error measured with this technique is within 0.5 dB for OSNR value from about 12 dB to 26 dB.

As discussed earlier, PMD has almost no effect on our inventive OSNR monitoring method, which is illustrated in FIG. 5b. As can be observed with reference to that FIG. 5b, we fixed the OSNR at 18.83 dB and changed the DGD value of the PMDE from 0 ps to 100 ps. In collecting this data, we first adjusted PC1 314 to set the worst case launch, e.g., the signal splits equally in the two principal states of polarization (PSPs) of the PMDE, and then we set the PC1 314 at arbitrary positions. From FIG. 5b, it can be seen that PMD does not induce any significant error in our OSNR monitoring method.

We also investigated the effect of inter-channel cross phase modulation (XPM) induced nonlinear polarization scattering in WDM systems on the performance of our method. To generate the nonlinear polarization scattering, a nonlinear transmission system was set up, as shown in FIG. 6.

Figure 6:
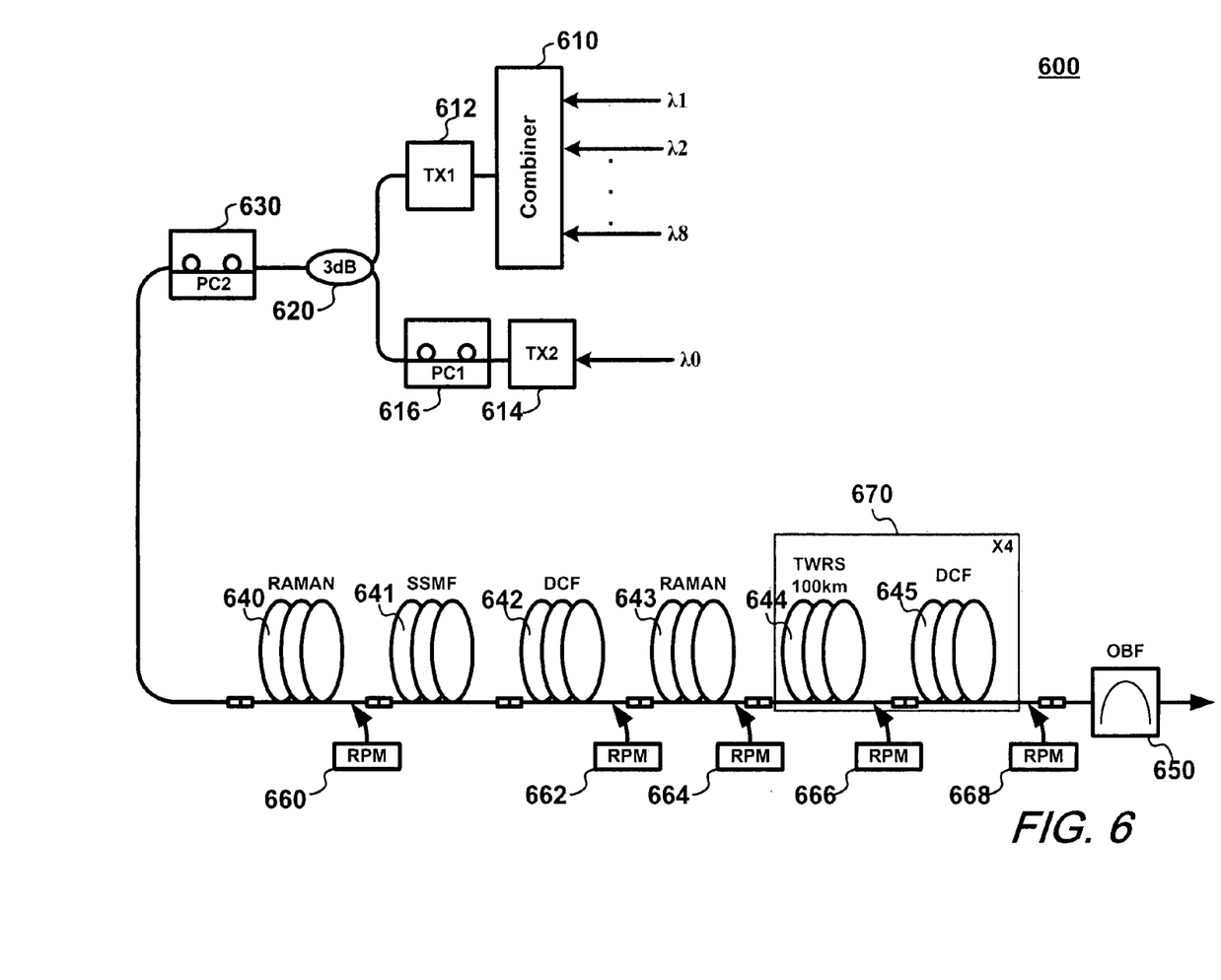
FIG. 6 is a schematic of an experimental apparatus used to generate nonlinear polarization scattering for evaluating the present invention.

With reference to that FIG. 6, the system is a four span 670 all-Raman amplified system with each span having a 100 km TRUEWAVE® Reduced Slope (TWRS) fiber 644 and a dispersion compensation fiber (DCF) 645. Raman amplifiers 640, 641, 642, and 643 were used after the transmitters to boost the launch power to induce nonlinear transmission effects. The launch power at each span was about 1 dBm/channel. The reference channel with wavelength of 1552.10 nm was modulated with an RZ modulator, and the other 8 channels surrounding the reference channel with 50 GHz channel spacing were modulated with another RZ modulator. The polarization controller PC1 616 was used to adjust the relative polarization state between the reference channel and the other 8 channels, and PC2 630 was used to adjust the launch polarization state of all the channels. The reference channel was filtered out after transmission with a 0.2 nm optical filters (JDS Fitel TB9 0.2 nm Optical Grating Filter) and sent to the EDFA1 in FIG. 3. The center frequencies of OBF1 and OBF2 in FIG. 3 were tuned to the reference channel.

Due to the high insertion loss (~18 dB) between EDFA1 and the Photo Detector in FIG. 3, the optical power at the Photo Detector was limited and we could not measure an OSNR curve like that in FIG. 5*a*. The nonlinear polarization scattering effects were tested with only a few cases.

In the first case, only the reference channel was transmitted, and the OSNR after the transmission was about 27 dB. The DOP after the OBF in FIG. 6 was about 0.96 (measured with HP Polarization Analyzer 8509B) and did not change when we varied the polarization controller PC2. After OBF1 in FIG. 3, the DOP was about 0.98. The minimum RF power at 10.5 GHz measured with the RFSA was −55 dBm in 3 MHz resolution. In the second case, we turned on the other six channels with the nearest channels about 100 GHz away from the reference channel (two channels were not turned on so that we could read OSNR with the OSA). The OSNR after the transmission was about 25 dB. When we varied PC1 in FIG. 6, the DOP after the OBF 650 in FIG. 6 fluctuated from 0.50 to 0.86 due to the nonlinear polarization scattering, and from 0.52 to 0.88 after the narrow bandwidth filter OBF1 in FIG. 3. The minimum RF power we obtained at 0.86 and 0.50 DOP (after OBF) was about −53 dBm and −52 dBm (corresponding to 2 and 3 dB lower OSNR than that in the first case), respectively. As those skilled in the art will readily appreciate, this indicates that this OSNR technique is only weakly affected by the nonlinear polarization scattering.

In addition to its robustness to PMD and the nonlinear polarization scattering, our inventive OSNR monitoring method also has the advantage of high sensitivity compared with the prior-art DOP based OSNR monitoring techniques. Consequently, our inventive method is effective at measuring large OSNR values. One reason for this advantageous aspect is that our inventive method measures the OSNR by detecting the signal-noise beating term, whereas the prior art DOP based OSNR monitoring techniques detect the noise—noise beating term, which is usually much smaller than the signal-noise beating term.

In our evaluations, the two narrow bandwidth optical filters employed had very high insertion loss, and the splitter and combiner contributed an additional 6 dB loss. To further enhance our inventive OSNR measuring method, the two filters and the splitter and combiner can be replaced by two arrayed-waveguide-grating (AWG) filters that exhibit negligible insertion loss. The AWG filters can be designed to have a FSR of 50 Hz or 100 GHz, aligned with ITU wavelength grid. By sweeping the channels with an optical channel filter at the input, which can also be integrated, we can monitor the OSNR for all the channels with our inventive method. Of further advantage, our inventive method does not need to recover the signal and is independent of modulation formats and bit rates, which are aspects that are highly desirable for OPM in all-optical networks.

Derivation of the Noise Power

For those interested in the theoretical background of our inventive method, we can derive the noise power with the measured optical power at Branches 1 and 2 and minimum RF power after the Photo Detector 140 at frequency $\Delta f$. We assume that $\Delta f = f_2 - f_1 > (B_1 + B_2)/2$, and $B_2 \geq B_1$. Without loss of generality, we assume that the signal is polarized in x axis. The optical field after filter OBF1 122 at Branch 1 is:

$$E_1 = \hat{x} \sum_{i=-k1}^{k1} \{A_{1i}^s \cos(\omega_1 + i\delta\omega)t + \qquad \text{(A1.a)}$$

$$A_{1i}^{nx} \cos[(\omega_1 + i\delta\omega)t + \varphi_{1i}^x]\} +$$

$$\hat{y} \sum_{i=-k1}^{k1} \{A_{1i}^{ny} \cos[(\omega_1 + i\delta\omega)t + \varphi_{1i}^y]\}$$

and the optical field after filter OBF2 123 at Branch 2 is:

$$E_2 = \hat{x} \sum_{i=-k2}^{k2} \{A_{2i}^s \cos(\omega_2 + i\delta\omega)t + \qquad \text{(A1.b)}$$

$$A_{2i}^{nx} \cos[(\omega_2 + i\delta\omega)t + \varphi_{2i}^x]\} +$$

$$\hat{y} \sum_{i=-k2}^{k2} \{A_{2i}^{ny} \cos[(\omega_2 + i\delta\omega)t + \varphi_{2i}^y]\}$$

where $A_{1i}^s$, $A_{1i}^{nx}$ and $A_{1i}^{ny}$ are the amplitude of signal, x and y axis polarized noise at frequency $f_1 + i\delta f$ at Branch 1, respectively, and $A_{2i}^s$, $A_{2i}^{nx}$ and $A_{2i}^{ny}$ are the amplitude of signal, x and y axis polarized noise at frequency $f_2 + i\delta f$ at branch 2, respectively. $\phi_{1i}^x$, $\phi_{1i}^y$, $\phi_{2i}^x$ and $\phi_{2i}^y$ are the random phase of the noise. $k1 = B_1/2\delta f$, and $k2 = B_2/2\delta f$.

If we assume that the signal and the noise after the filter have a flat spectrum, we have $A_{1i}^s = \sqrt{2(\delta f/B_1)S_1}$, $A_{1i}^{nx} = \sqrt{2(\delta f/B_1)N_1^x}$, $A_{1i}^{ny} = \sqrt{2(\delta f/B_1)N_1^y}$, $A_{2i}^s = \sqrt{2(\delta f/B_2)S_2}$, $A_{2i}^{nx} = \sqrt{2(\delta f/B_2)N_2^x}$ and $A_{2i}^{ny} = \sqrt{2(\delta f/B_2)N_2^y}$. $S_1$ and $S_2$ are the signal power at Branches 1 and 2, and $N_1^x$, $N_1^y$, $N_2^x$ and $N_2^y$ are the x and y polarized ASE noise power at branches 1 and 2, respectively.

When the signal at the Photo Detector 140 from the two branches are orthogonally polarized, we have:

$$E_x = \sum_{i=-k1}^{k1} \{A_{1i}^s \cos(\omega_1 + i\delta\omega)t + \qquad \text{(A3.a)}$$

$$A_{1i}^{nx} \cos[(\omega_1 + i\delta\omega)t + \varphi_{1i}^x]\} +$$

$$\sum_{i=-k2}^{k2} A_{2i}^{ny} \cos[(\omega_2 + i\delta\omega)t + \varphi_{2i}^y]$$

$$E_y = \sum_{i=-k2}^{k2} \{A_{2i}^s \cos(\omega_2 + i\delta\omega)t + \qquad \text{(A3.b)}$$

$$A_{2i}^{nx} \cos[(\omega_2 + i\delta\omega)t + \varphi_{2i}^x]\} +$$

$$\sum_{i=-k1}^{k1} A_{1i}^{ny} \cos[(\omega_1 + i\delta\omega)t + \varphi_{1i}^y]$$

We can obtain the low frequency beating terms between Branches 1 and 2 as:

$$E_x^2 = \frac{1}{2}\sum_{i=-k1}^{k1}\sum_{j=-k2}^{k2}\{A_{1i}^s A_{2j}^{ny}\cos[(\omega_2-\omega_1+(j-i)\delta\omega)t+\varphi_{2j}^y]+ \quad (A4.a)$$

$$A_{1i}^{nx} A_{2j}^{ny}\cos[(\omega_2-\omega_1+(j-i)\delta\omega)t+\varphi_{2j}^y-\varphi_{1i}^x]\}$$

$$E_y^2 = \frac{1}{2}\sum_{i=-k1}^{k1}\sum_{j=-k2}^{k2}\{A_{1i}^{ny} A_{2j}^s\cos[(\omega_2-\omega_1+(j-i)\delta\omega)t-\varphi_{1i}^y]+ \quad (A4.b)$$

$$A_{1i}^{ny} A_{2j}^{nx}\cos[(\omega_2-\omega_1+(j-i)\delta\omega)t+\varphi_{2j}^x-\varphi_{1i}^y]\}$$

Figure 7:
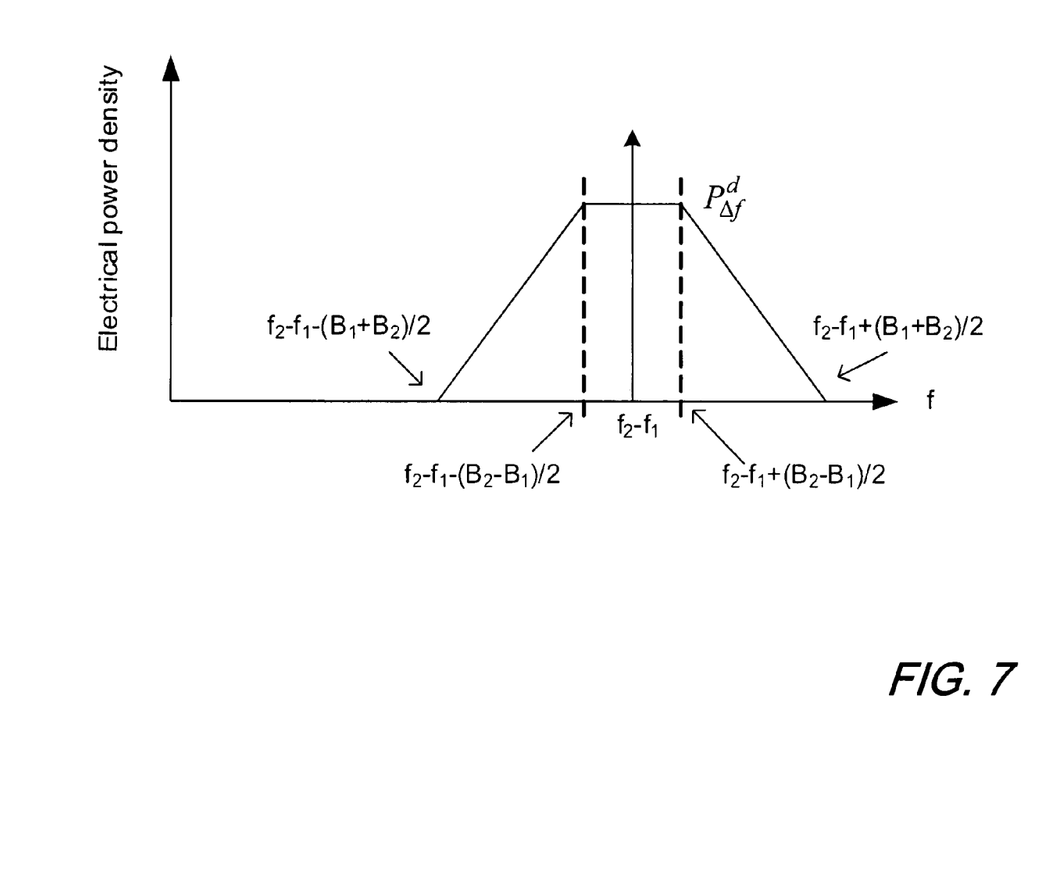
FIG. 7 is a graph showing the electrical power spectrum of signal-noise beating term(s) between Branches 1 and 2 of FIG. 1.

The first term is the signal-ASE noise beating and second one is the ASE—ASE noise beating in the Eqs. (A4.a) and (A4.b). The photocurrent due to the beating between branches 1 and 2 is:

$$I=R(E_x^2+E_y^2) \quad (A5)$$

where R is the PD responsivity, and the RF power can be expressed as:

$$P_{rf}=\overline{I^2}R_L \quad (A6)$$

where $R_L$ is the load resistor and the bar indicating time averaging over RF frequency. By organizing the terms in (A6) according to their frequencies, we can get the RF power density of the signal-noise beating term as shown in FIG. 7 when the two branches are orthogonally polarized. The electrical power density around frequency $\Delta f$ is:

$$P_{\Delta f}^d = \frac{R^2 R_L(S_1 N_2^y + S_2 N_1^y + N_1^x N_2^y + N_1^y N_2^x)}{2B_2} \quad (A7)$$

We can assume that the noise power after filters OBF1 122 and OBF2 123 has the relation: $N_1^x=N_x$, $N_2^x=\alpha N_x$, $N_1^y=N_y$, $N_2^y=\alpha N_y$, where $\alpha$ can be obtained from calibration of the two optical filters. By measuring the minimum RF power and optical power in Branches 1 and 2, we can obtain the noise power orthogonally polarized to the signal as $$N_y = \frac{(\alpha P_1 + P_2) - \sqrt{(\alpha P_1 + P_2)^2 - 16\alpha P_{\Delta f} B_2/(R^2 R_L B_e)}}{4\alpha} \quad (A8)$$

where $P_1=S_1+N_x+N_y$ and $P_2=S_2+\alpha(N_x+N_y)$ are the optical power after filters OBF1 122 and OBF2 123, $P_{\Delta f}=P_{\Delta f}^d B_e$ is the detected minimum electrical power after the electrical bandpass filter EBF, and $B_e$ is the bandwidth of EBF.

At this point, while we have discussed and described our invention using some specific examples, those skilled in the art will recognize that my teachings are not so limited. Accordingly, our invention should be only limited by the scope of the claims attached hereto.

What is claimed is:

1. A method for monitoring the signal-to-noise-ratio of an optical signal comprising the steps of:
   measuring, a power measurement $P_0$, of the optical signal;
   splitting, the optical signal into two branch signals;
   filtering, one of the branch signals with a first narrow bandwidth optical filter;
   filtering, the other branch signal with a second narrow bandwidth optical filter, wherein said first and second narrow bandwidth optical filters have different center frequencies;
   rotating, the polarization of the branch signal filtered by the second narrow bandwidth optical filter to be orthogonally polarized to the other branch signal;
   measuring, a power measurement $P_1$, of the branch signal filtered with the first narrow bandwidth optical filter;
   measuring, a power measurement $P_2$ of the polarization scrambled branch signal;
   combining, the filtered branch signal(s) from each of the branches into a combined branch signal;
   converting, the combined branch signal into an electrical signal;
   filtering, the electrical signal with an electrical bandpass filter centered at $\Delta f$, where $\Delta f=|f_1-f_2|$; and $f_1$ is the center frequency of the first narrow bandwidth optical filter and $f_2$ is the center frequency of the second narrow bandwidth optical filter; and
   measuring a minimum power $P_{\Delta f}$ of the filtered electrical signal.

2. The method claim 1, wherein said filtering of the branch signal(s) is accomplished through the effect of an arrayed waveguide grating (AWG) device.

3. The method of claim 2, further comprising the steps of:
   sweeping any channels of the optical signal through the effect of an optical channel filter.

4. The method of claim 3 wherein said AWG device(s) have an FSR of 50 Hz or 100 GHz, in agreement with ITU grid.

5. The method of claim 1 wherein $\Delta f=|f_1-f_2|$; and $f_1$ is the center frequency of the first narrow bandwidth optical filter and $f_2$ is the center frequency of the second narrow bandwidth optical filter; and $f_1-f_2 \geq (B_1+B_2)/2$ and $B_2 \geq B_1$; where $B_1$ is the bandwidth of the first narrow bandwidth optical filter and $B_2$ is the bandwidth of the second narrow bandwidth optical filter.

6. The method of claim 5 further comprising the steps of:
   determining a noise power according to the relationship:

$$N_y = \frac{(\alpha P_1 + P_2) - \sqrt{(\alpha P_1 + P_2)^2 - 16\alpha P_{\Delta f} B_2/(R^2 R_L B_e)}}{4\alpha}$$

where $P_1=S_1+N_x+N_y$ and $P_2=S_2+\alpha(N_x+N_y)$ are the optical power(s) measured in the branch(es), $P_{\Delta f}=P_{\Delta f}^d B_e$ is the detected minimum electrical power after the electrical bandpass filter EBF, and $B_e$ is the bandwidth of EBF.

7. The method claim 1, wherein said filtering of the branch signal(s) is accomplished through the effect of a free space optical device comprising a lens and a grating.

8. The method claim 1, wherein at least one of said narrow bandwidth optical filters exhibits a FSR of 50 Hz or 100 GHz, in agreement with ITU grid.

9. An apparatus for monitoring the signal-to-noise-ratio of an optical signal comprising:
   a power meter, for measuring the power $P_0$, of the optical signal;
   a splitter, for splitting the optical signal into two branch signals;
   a first narrow bandwidth optical filter for filtering, one of the branch signals;

a second narrow bandwidth optical filter, for filtering the other branch signal, wherein said first and second narrow bandwidth optical filters have different center frequencies;

a polarization rotator, for rotating the polarization of the branch signal filtered by the second narrow bandwidth optical filter to be orthogonally polarized to the other branch signal;

a power meter, for measuring the power $P_1$, of the branch signal filtered with the first narrow bandwidth optical filter;

a power meter, for measuring the power $P_2$ of the polarization scrambled branch signal;

a combiner, for combining the filtered branch signal from one of the branches and the scrambled branch signal from the other branch, into a combined branch signal;

an optical-electrical converter, for converting the combined branch signal into an electrical signal;

a bandpass filter for filtering the electrical signal, said bandpass filter being centered at $\Delta f$, where $\Delta f=|f_1-f_2|$; and $f_1$ is the center frequency of the first narrow bandwidth optical filter and $f_2$ is the center frequency of the second narrow bandwidth optical filter; and a power meter, for measuring a minimum power $P_{\Delta f}$ of the filtered electrical signal.

10. The apparatus of claim 9, wherein said first and second narrow bandwidth optical filters comprise an arrayed waveguide grating (AWG) device.

11. The apparatus of claim 10, further comprising:

an optical channel filter, for sweeping any channels of the optical signal.

12. The apparatus of claim 11 further comprising the steps of:

a noise power meter which determines the noise power from the relationship:

$$N_y = \frac{(\alpha P_1 + P_2) - \sqrt{(\alpha P_1 + P_2)^2 - 16\alpha P_{\Delta f} B_2 / (R^2 R_L B_e)}}{4\alpha}$$

where $P_1=S_1+N_x+N_y$, and $P_2=S_2+\alpha(N_x+N_y)$ are the optical power(s) measured in the branch(es), $P_{\Delta f}=P_{\Delta f}^d B_e$ is the detected minimum electrical power after the electrical bandpass filter EBF, and $B_e$ is the bandwidth of EBF.

13. The apparatus of claim 10 wherein said AWG device(s) have an FSR of 50 Hz or 100 GHz, in agreement with ITU grid.

14. The apparatus of claim 9 wherein $\Delta f=|f_1-f_2|$; and $f_1$ is the center frequency of the first narrow bandwidth optical filter and $f_2$ is the center frequency of the second narrow bandwidth optical filter; and $f_1-f_2 \geq (B_1+B_2)/2$ and $B_2 \geq B_1$; where $B_1$ is the bandwidth of the first narrow bandwidth optical filter and $B_2$ is the bandwidth of the second narrow bandwidth optical filter.

15. An apparatus for monitoring the signal-to-noise-ratio of an optical signal comprising:

means for measuring the power $P_0$, of the optical signal;

means for splitting the optical signal into two branch signals;

means for filtering, one of the branch signals;

means for filtering the other branch signal, wherein said first and second filtering means have different center frequencies;

means for rotating the polarization of the filtered, other branch signal to be orthogonally polarized to one other branch signal;

means for measuring the power $P_1$, of the filtered, branch signal;

means for measuring the power $P_2$ of the scrambled branch signal;

means for combining the filtered branch signal the scrambled branch signal, into a combined branch signal;

means for converting the combined branch signal into an electrical signal;

means for filtering the electrical signal, said electrical signal filtering means being centered at $\Delta f$, where $\Delta f=|f_1-f_2|$; and $f_1$ is the center frequency of one of the optical filtering means and $f_2$ is the center frequency of the other optical filtering means; and means measuring a minimum power $P_{\Delta f}$ of the filtered electrical signal.

16. The apparatus of claim 15, wherein said optical filtering means comprise an arrayed waveguide grating (AWG) device.

17. The apparatus of claim 16, further comprising:

means for sweeping through any channels of the optical signal.

18. The apparatus of claim 16 wherein said AWG device(s) have an FSR of 50 Hz or 100 GHz, in agreement with ITU grid.

19. The apparatus of claim 15 wherein $\Delta f=|f_1-f_2|$; and $f_1$ is the center frequency of one of the optical filtering means and $f_2$ is the center frequency of the other optical filtering means; and $f_1-f_2 \geq (B_1+B_2)/2$ and $B_2 \geq B_1$; where $B_1$ is the bandwidth of one of the optical filtering means and $B_2$ is the bandwidth of the other optical filtering means.

20. The apparatus of claim 19 further comprising the steps of:

means for determining the noise power from the relationship:

$$N_y = \frac{(\alpha P_1 + P_2) - \sqrt{(\alpha P_1 + P_2)^2 - 16\alpha P_{\Delta f} B_2 / (R^2 R_L B_e)}}{4\alpha}$$

where $P_1=S_1+N_x+N_y$, and $P_2=S_2+\alpha(N_x+N_y)$ are the optical power(s) measured in the branch(es), $P_{\Delta f}=P_{\Delta f}^d B_e$ is the detected minimum electrical power after the electrical signal filtering means, and $B_e$ is the bandwidth of the electrical signal filtering means.

* * * * *